United States Patent Office 3,274,067
Patented Sept. 20, 1966

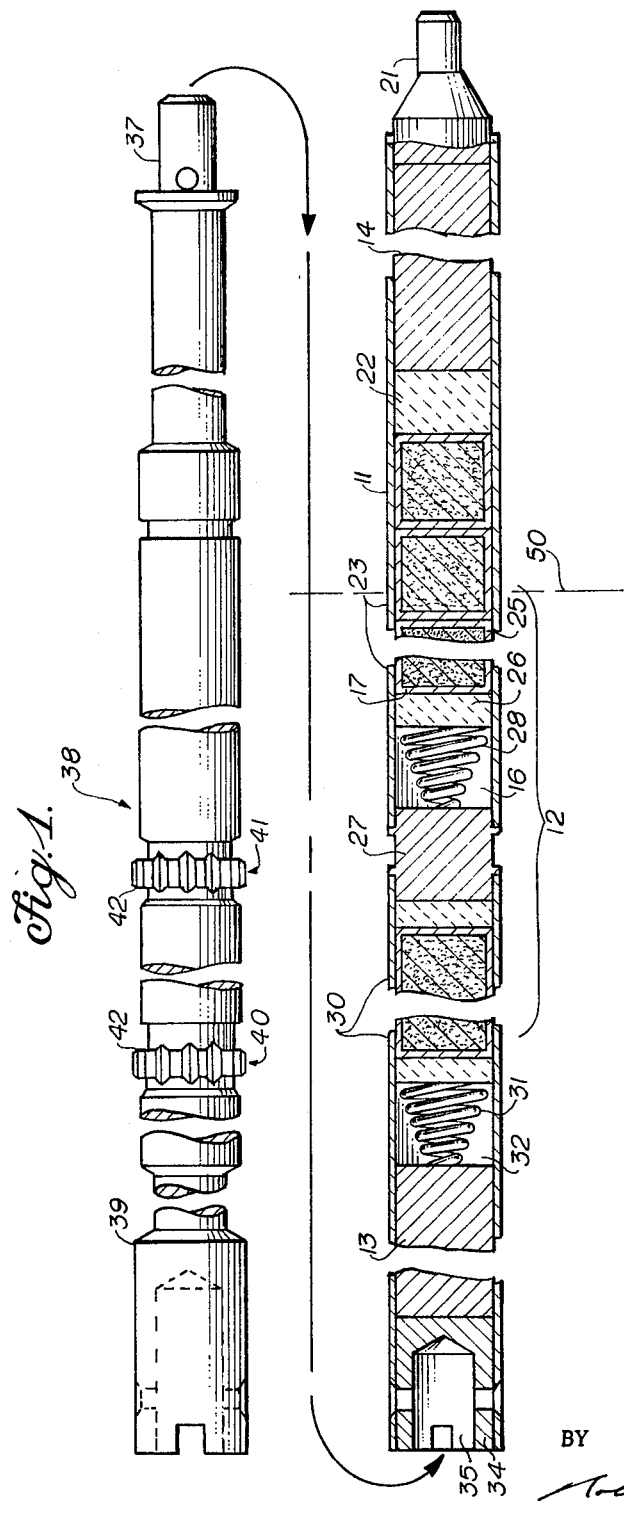

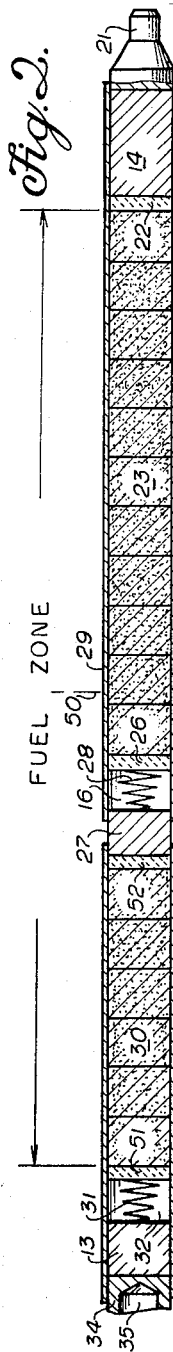

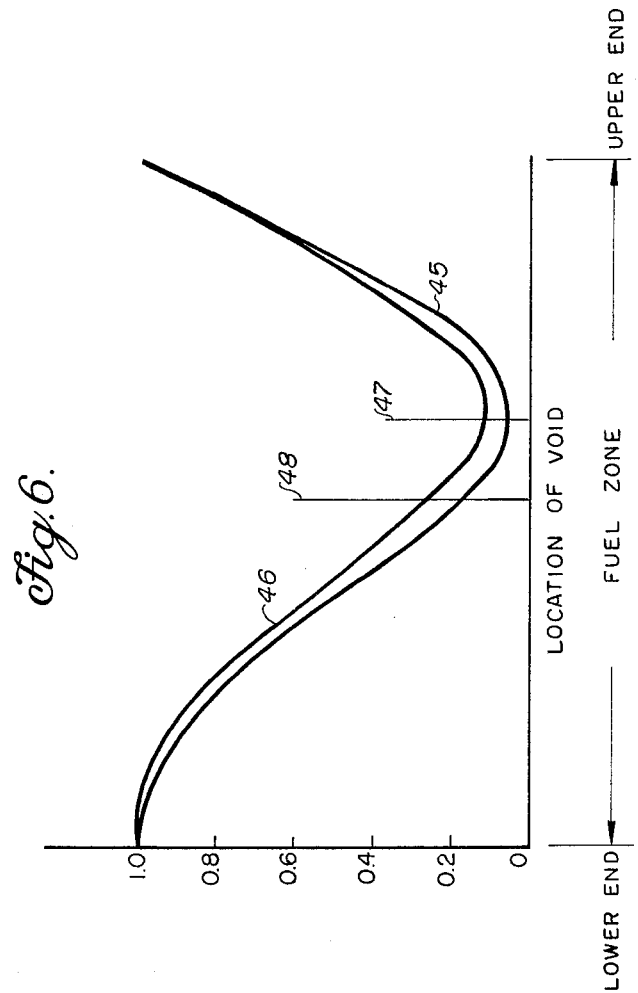

3,274,067
FUEL ROD DESIGN
Paul Greebler, Kenneth M. Horst, Eugene E. Olich, and Bertram Wolfe, all of San Jose, Calif., assignors to the United States of America as represented by the United States Atomic Energy Commission
Filed June 7, 1965, Ser. No. 462,145
3 Claims. (Cl. 176—68)

The invention described herein was made in the course of, or under, contract No. AT(04–3)–540 with the United States Atomic Energy Commission.

This invention relates to fuel rods for nuclear reactors and in particular to fuel rods having segmented fuel portions arranged to thermally expand and contract with respect to each other in a compensatory manner to achieve a thermal expansion coefficient of reactivity approaching zero.

It is desirable, for the purpose of easily and accurately measuring the Doppler coefficient of a nuclear reactor core and isolating the phenomena of Doppler broadening from other neutronic phenomena of a nuclear reactor, to reduce the effect of change in reactivity due to axial thermal expansion of the fuel to a minimum or preferably zero. It is additionally desirable in a reactor where fast or high energy neutrons are utilized to maintain the fission reaction, to increase neutron economy at high power levels by reducing neutron leakage. Increased neutron leakage results when the outer surface area of an elongated cylindrical core increases due to axial thermal expansion of the fuel. The increase in volume and corresponding decrease in reactivity due to neutron leakage will thus mask out the reduction in reactivity due to Doppler broadening. The use of Doppler broadening for control of excursions in fast neutron reactors is described in detail in copending application of Paul Greebler, Serial Number 345,056, filed February 14, 1964 and is incorporated herein to the extent that it is pertinent to the description herein.

The present invention permits the effect of Doppler broadening to be measured directly and additionally permits its isolated use to reduce the effect of a rapid increase in reactivity without influence from other reactor core phenomena. The present invention accordingly greatly simplifies the control of the reactor using the aforesaid Doppler effect or in other instances in which the thermal expansion effects on reactivity complicates control.

In some reactor cores of the prior art, fissile fuel material is normally enclosed in individual containers and serially arranged in a fuel rod or fuel element primarily for the purpose of containing dangerous radioactive fission products. In other reactor cores of the prior art, the fissile fuel material is enclosed in an individual container or compacted to form a high density ceramic pellet within a cladding such as a fuel rod. In these prior art fuel rods, a space was sometimes provided at random or at regular intervals between the individual fissile fuel containers or dense ceramic pellets and the fuel cladding to allow for expansion of the fuel material. The spacing was provided for the primary and only purpose of preventing structural buckling of the fuel rod where both ends of the rod were held in a rigid or fixed relation to each other such as in a pressurized water reactor. No effort was made, in the reactor cores of the prior art, to utilize in an effective manner thermal expansion of properly constructed fuel segments into properly disposed gap regions to reduce or modify the thermal expansion coefficient of reactivity.

In the method and device of the present invention, the fuel is divided into segments which are arranged to expand individually into predetermined gap areas and are of a specified length, specified in number and arranged in a specified manner within the core to achieve a zero or near zero thermal expansion coefficient of reactivity. Incidental thereto, accommodation to linear thermal expansion is also achieved.

It is, therefore, an object of this invention to provide a fuel rod having an overall thermal expansion coefficient of reactivity approaching zero.

It is a further object of this invention to provide a fuel rod whereby the Doppler broadening effect may be used as the primary means for controlling a reactor excursion or otherwise controlling the operating power level of a neutronic reactor.

It is another object of this invention to provide a fuel rod wherein the fuel is segmented and expands and contracts independent of the outer cladding.

Other and more particular objects of this invention will be manifest upon study of the following detailed description when taken together with the accompanying drawing, in which:

FIGURE 1 is a longitudinal section of a two-segment embodiment of the fuel element showing the parts in detail;

FIGURE 2 is a longitudinal section of a two-segment embodiment of the fuel element showing basic features as to segment length;

FIGURE 3 is a longitudinal section of a three-segment embodiment of the fuel element showing basic features as to segment length;

FIGURE 4 is a longitudinal section of a four-segment embodiment of the fuel element showing basic features as to segment length;

FIGURE 5 is a longitudinal section of a five-segment embodiment of the fuel element showing basic features as to segment length; and FIGURE 6 is a graph illustrating the effect of varying the position of the inner void along the length of a two-segment fuel element.

The thermal expansion reactivity coefficient is defined herein as the change in reactivity for change in thermal expansion per unit length (e.g. centimeters along the longitudinal axis of the fissile fuel at temperatures close to normal or rated operating power. It will be appreciated that such expansion is not constant at higher or lower temperatures; however, the specific value of any chosen operating level does not modify the principle of operation and is not to be construed as controlling of the principle, concept or operations of this invention.

Referring to FIGURE 1, the fuel element of this invention comprises essentially a tubular cladding 11 encasing a fuel zone 12 between upper and lower end neutron reflector plugs 13 and 14, respectively, with fuel zone 12 including solid fissile fuel material divided into at least two and no more than five segments slidably mounted therein. Upper and lower fuel segments with lengths selected in accord with principles discussed more fully hereinafter are retained in compression between spring means and a fixed stop such that it is fixed at its lower end and allowed to expand against spring means, e.g., 28 or 31 into a void 16 (for lower segment 23) or 32 for upper segment 30 at its upper end. Such segments can be provided as an appropriate number of separately clad subsegments 17 serially arranged along the length of the fuel element, in groups, in loose fitting relation inside cladding 11 such that cladding 11 will not be carried along by axial expansion of subsegments 17. The lengths and number of fuel segments are mounted and particularly arranged as hereinafter described to reduce the thermal expansion coefficient of reactivity to approach zero. In essence one of said segments 30 is mounted within said cladding with the lower end fixed in relation to said cladding and the upper end expansible into a void 32 at the upper end of said cladding. A second segment is fixed to said cladding below the midplane with the upper end extending across the midplane and expansible into a void 17 effectively between the top thereof and the lower end of segment 30.

The foregoing basic arrangement is provided with appropriate modifications, described hereinafter, to include from 2 to 5 fuel segments. A typical embodiment for a two-segment fuel element is illustrated in FIGURE 2 illustrating the disposition and the length of segment necessary for operation in accord with this invention. Basically the construction details for the two segment fuel element will also be applicable to fuel elements with more than two segments.

For mounting in a reactor core vessel (not shown) referring to FIGURE 1, a bottom support pin 21 is provided at the lower end of cladding 11 and is affixed as by welding or the like thereto. Bottom support pin 21 is arranged to be received and supported in a recess or hole in a grid plate (not shown) in a reactor containment vessel (not shown). Above and in immediate contact with the bottom support pin 21 there is disposed within said cladding 11 a stop 14 serving as a lower neutron reflector which is fabricated from nickel, carbon or like neutron reflective material. Adjacent above lower neutron reflector 14 is lower segment insulator pellet 22 fabricated from any high temperature thermal insulation material, e.g., aluminum oxide, magnesia, sapphire or the like. In contact with said insulation pellet 22 is, for the two segment fuel element embodiment, the lower end surface of a relatively elongated lower fuel segment 23 comprised of a grouped plurality of serially arranged subsegments 17. Each subsegment is an individually clad compact containing fissile fuel, e.g., $UO_2$, $PuO_2$, mixtures thereof for the like. Subsegment cladding 25 may comprise any one or more of the usual nuclear reactor grade stainless steels or an alloy of zirconium or other low neutron absorbing metal. The outside diameter of the subsegments is arranged to be less than the inside diameter of fuel element cladding 11 at operating temperatures to permit unobstructed axial movement of segment 23 within cladding 11 with relation to insulator 22 and stop 14. In immediate contact with the topmost subsegment of lower fuel segment 23 is lower segment upper insulator pellet 26 of diameter at operating temperature equal to the diameter of subsegment 17. Above said insulator 26 is void 16 and above void 16 is plug 27 affixed by welding or the like to the upper end of the lower portion 29 of fuel element cladding 11. In void 16 in compression against both plug 27 and insulator pellet 26 is spring 28 which holds the serially arranged subsegments 17 in place against insulator pellet 22 and lower neutron reflector 14. Thus lower fuel segment 23 can only expand upwardly against spring 25 into void 16. Moreover, lower cladding portion 29 can independently expand upwardly carrying plug 27 therewith.

In a like manner, upper fuel segment 30 is arranged with the lower end of upper portion 33 of fuel element cladding 11 surrounding said segment 30 which portion 33 is affixed at its lower end as by welding or the like to plug 27. The upper end of upper fuel segment 30 compresses top spring 31 in top void 32 against upper neutron reflector stop 13 fabricated of material similar to lower neutron reflector 14, which reflector 13 in turn is in immediate contact with top coupling 34. Top coupling 34 is affixed as by welding or the like to fuel element cladding 11. Top coupling 34 is also provided with recess 35 into which male plug end 37 of extension rod 38 fits and is attached as by screws, rivets, pins or the like. Extension rod 38 is used for both inserting and removing the fuel element into and from the bundle of like fuel elements comprising the core of the reactor and additionally can act as a radiation shield over the top of the core. Upper and lower ferrules 40 and 41 are arranged to abut like ferrules of adjacent fuel elements with slots 42 of ferrules 40 and 41 arranged to prevent neutron streaming along the rod causing activation of the reactor vessel head (not shown). Extension rod head 39 is provided at the upper end of extension rod 38 adapted to receive a grappling means (not shown) for lifting the extension rod-fuel element unit out of the reactor.

Of particular note is the location of void 16 in the two-segment fuel element. Whereas the three-, four-, and five-segment fuel elements have segments of equal lengths, it has been found that for the two-segment fuel element, the void 16 at the top of lower segment 23, must be above transverse mid-plane 50 of the fuel element with the upper end of segment 23 movable thereinto with the lower end fixed below said midplane. FIGURE 6 is a graph showing the percentage reduction in thermal expansion coefficient of reactivity as a function of location of void 16 within the core along the length of the two-segment fuel element. Curve 45 illustrates the percentage reduction in the thermal expansion coefficient of reactivity for isothermal or steady state heating. Curve 46 illustrates the same effect for a fast transient heating as would occur during a sudden increase in reactivity. It will be noted that point 47, where the thermal expansion coefficient of reactivity is at a minimum, occurs above midpoint 48 which corresponds to transverse midplane 50 of the fuel element, of FIGURE 2. For a two-segment fuel element having a total fissile fuel segment length of 85.94 cm., point 47 is approximately 10 cm. above tranverse midplane 50 (point 48 on curves 45 and 46 of FIGURE 6) of the fuel element.

It has been found that for the three-, four-, and five-segment fuel elements, the length of segments may be made equal to achieve the desired results, a circumstance which fortuitously simplifies fuel fabrication. It has also been found that the use of more than five segments will introduce too great a volume of neutron absorbing material into the reactor core for the benefit gained in further reducing the thermal expansion coefficient of reactivity.

For the three-, four-, and five-segment fuel element as illustrated in FIGURES 3, 4 and 5 respectively, the configurations for upper reflector 13 and above as well as lower reflector 14 and below is identical to the two-segment fuel element of FIGURES 1 and 2. The three-segment fuel element of FIGURE 3 comprises a top void 32 immediately below upper reflector 13, a first upper insulator pellet 51 held in compression against serially arranged subsegments in upper fuel segment 30 by spring 28 located in top void 32. The lower end of upper fuel segment 30 rests against first lower insulator pellet 52 which in turn rests against plug 53 fabricated from stainless steel or the like. Cladding 11 of the fuel element is affixed as by welding or the like to said first plug 53. Immediately below first plug 53 arranged in a manner similar to top void 32, first upper insulator pellet 51, upper segment 30, first lower insulator pellet 52, and first plug 53 is second void 55, second upper insulator pellet 56, second segment 57, second lower insulator pellet 58 and second plug 59. Second spring 60 is arranged in second void 55 to maintain second segment 57 in compression. Immediately below second plug 59 in a like manner as above, is arranged third void 63 containing a third spring 64, third upper insulator pellet 65, third segment 66 and third lower insulator pellet 67 in compression against lower neutron reflector 14.

The four-segment fuel element is similar to the three segment element however with third plug 69, fourth void 70 containing a fourth spring 71, fourth upper insulator pellet 72, fourth segment 73 and fourth lower insulator pellet 74 in compression against lower neutron reflector 14 all serially arranged below third insulator pellet 67.

In a like manner, for the five-segment fuel element, fourth plug 75, fifth void 76, fifth spring 77, fifth upper insulator 78, fifth segment 79 and fifth lower insulator pellet 80 in compression against lower neutron reflector 14 are all serially arranged below fourth insulator pellet 74.

To more aptly demonstrate the effect of segmenting the fuel as described above, Table I is arranged to show data regarding examples of two-, three-, four-, and five-segment fuel elements of this invention compared with a fuel element identical in all respects to the above with the exception that the fuel is not segmented. In all five examples, the amount of fissile fuel contained in each fuel element is the same. The numeral preceding the fuel element part is the reference character for a corresponding dimension line shown in FIGURES 2, 3, 4, and 5 as applicable to the two-, three-, four-, or five-segment fuel element respectively. Although a fuel element having no fuel segmentation is listed in Table I, no drawing has been included of the unsegmented fuel element since it is not a part of nor represents an embodiment of this invention and is used only for comparison. It is believed a person skilled in the art will readily understand its construction. Table II includes data pertinent to a typical fast neutron reactor which would beneficially use the fuel rods of this invention to form a reactor core.

When a nuclear reactor core, comprising a plurality of segmented fuel elements of this invention, is placed in operation and raised from room temperature to operating power it is obvious that both cladding 11 as well as the fuel segments will expand axially due to their inherent linear thermal expansion properties which, for the cladding of stainless steel is $9.8 \times 10^{-6}/°F.$, and for the fuel is $5.4 \times 10^{-6}/°F.$ Thus from startup to operating temperature the segments will expand concurrently with a relative expanding movement between segments. As the bottom segment expands upward into its void, the top segment will also expand upward into its void but will also, as a unit, be moved upward away from the bottom segment due to the axial thermal expansion of cladding 11. During this period the fuel element of this invention will not adequately operate in the manner above described to compensate for the change in the thermal expansion coefficient of reactivity. It is preferred that the fuel element of this invention operate when the reactor reaches operating power such that the rate of flow of coolant may be varied to maintain a constant cladding temperature while the temperature of the fuel and resulting expansion of the fuel may vary in response to the reactivity level. Also, in the event of a sudden increase in reactivity resulting in a sudden increase in fuel temperature, a finite time period will elapse before the fuel element cladding increases in temperature. This time period is usually of the order of milliseconds. In either case, axial thermal expansion of the cladding will not affect the operation of the fuel element of this invention.

Calculations for determining the thermal expansion coefficient of reactivity can be performed accordingly for a one-dimensional system using diffusion theory by digital computer means through iterative computations. Basically neutron leakage plus neutron absorption is balanced against the source of neutrons from fission reactions by repeated calculations by the digital computer. Within the accuracy of these calculations, the number of segments required for the thermal expansion coefficient of reactivity to reach zero is found to not exceed five and increases in the number of segments thereafter continues at a zero level. No further improvement is thereby gained and an increasing penalty in the increase of extraneous materials results. A four or five segment fuel element is accordingly near optimum.

TABLE I

| Fuel Element Configuration | | No Segmentation (No drawing) | Two-Segment (Figure 2) | Three-Segment (Figure 3) | Four-Segment (Figure 4) | Five-Segment (Figure 5) |
|---|---|---|---|---|---|---|
| Dimension Reference Character | Item | | | | | |
| | | Cm. | Cm. | Cm. | Cm. | Cm. |
| 101 | Extension Rod 38 (Neutron Shield) and Connectors. | 38.10 | 38.10 | 38.10 | 38.10 | 38.10 |
| 102 | Upper Reflector 13 | 10.19 | 10.19 | 10.19 | 10.19 | 10.19 |
| 103 | Top Void 32 | 6.55 | 2.35 | 1.94 | 1.50 | 0.88 |
| 104 | First Upper Insulator Pellet 51 | 0.95 | 0.95 | 0.95 | 0.95 | 0.95 |
| 105 | Upper Fuel Segment 30 | 85.94 | 32.96 | 28.65 | 21.47 | 17.19 |
| 106 | First Lower Insulator Pellet 52 | | 0.95 | 0.95 | 0.95 | 0.95 |
| 107 | First Plug 27 (Fig. 2) or 53 (Figs. 3, 4, and 5). | | 1.59 | 1.59 | 1.59 | 1.59 |
| 108 | Second Void 16 (Fig. 2) or 55 (Figs. 3, 4 and 5). | | 4.19 | 2.78 | 1.85 | 1.61 |
| 109 | Second Upper Insulator Pellet 26 (Fig. 2) or 56 (Figs. 3, 4 and 5). | | 0.95 | 0.95 | 0.95 | 0.95 |
| 110 | Second Fuel Segment 23 (Fig. 2) or 57 (Figs. 3, 4 and 5). | | 52.98 | 28.65 | 21.48 | 17.19 |
| 111 | Second Lower Insulator Pellet 22 (Fig. 2) or 58 (Figs. 3, 4 and 5). | | 0.95 | 0.95 | 0.95 | 0.95 |
| 112 | Second Plug 59 | | | 1.59 | 1.59 | 1.59 |
| 113 | Third Void 63 | | | 1.83 | 1.80 | 1.67 |
| 114 | Third Upper Insulator Pellet 65 | | | 0.95 | 0.95 | 0.95 |
| 115 | Third Fuel Segment 66 | | | 28.65 | 21.48 | 17.19 |
| 116 | Third Lower Insulator Pellet 67 | | | 0.95 | 0.95 | 0.95 |
| 117 | Third Plug 69 | | | | 1.59 | 1.59 |
| 118 | Fourth Void 70 | | | | 1.40 | 1.61 |
| 119 | Fourth Upper Insulator Pellet 72 | | | | 0.95 | 0.95 |
| 120 | Fourth Fuel Segment 73 | | | | 21.48 | 17.19 |
| 121 | Fourth Lower Insulator Pellet 74 | | | | 0.95 | 0.95 |
| 122 | Fourth Plug 75 | | | | | 1.59 |
| 123 | Fifth Void 76 | | | | | 0.77 |
| 124 | Fifth Upper Insulator Pellet 78 | | | | | 0.95 |
| 125 | Fifth Fuel Segment 79 | | | | | 17.19 |
| 126 | Fifth Lower Insulator Pellet 80 | | | | | 0.95 |
| 127 | Lower Reflector 14 | 10.19 | 10.19 | 10.19 | 10.19 | 10.19 |
| 128 | Bottom Support Pin 21, Grid Plate, Sodium and Gamma Shield. | 43.18 | 43.18 | 43.18 | 43.18 | 43.18 |
| | Reactor Core Diameter | 86.07 | 86.07 | 86.07 | 86.07 | 86.07 |
| | Fuel Element Diameter | 2.54 | 2.54 | 2.54 | 2.54 | 2.54 |
| | Fuel Pellet Diameter | 2.24 | 2.24 | 2.24 | 2.24 | 2.24 |
| | Fuel Temperature, °F | 4,500 | 4,500 | 4,500 | 4,500 | 4,500 |
| | Cladding Temperature, °F | 800 | 800 | 800 | 800 | 800 |
| | Operating Power (Total for Reactor), MW. | 20 | 20 | 20 | 20 | 20 |
| | Thermal Expansion Coefficient of Reactivity. | −0.0038 | −0.0011 | −0.0001 | zero | +0.0006 |

Referring to Table I, it can be seen that the absolute value of the thermal expansion coefficient of reactivity has been substantially reduced by substituting a segmented fuel element for the non-segmented fuel element of conventional design. It can be seen that to increase segmentation of the fuel beyond five segments would result in the coefficient remaining near zero or going slightly positive thus gaining no additional benefit from segmentation. On the contrary, additional segmentation would tend to be disadvantageous by introducing more neutron absorbing material in the core thus reducing neutron economy and tending to require more fissile fuel for the same power output. Thus segmentation of the fuel and the provision of voids as above described causes the thermal expansion coefficient to approach, and in the case of the four-segmented fuel element, reach zero thus permitting the thermal expansion of the fuel to not affect reactivity of the reactor.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

TABLE II

Reactor type _____ Fast neutron, heterogeneous.
Fuel:
　Mixed $PuO_2$–$UO_2$ pelletized,
　　total enrichment _____ 0.168 atom percent.
Moderator materials (volume fraction):
　BeO _____ 10.02 percent.
　Stainless steel _____ 23.77 percent.
　Sodium _____ 20.88 percent.
Mean neutron energy _____ 120 kev. (max. energy 2.5 mev.).
Power output _____ 20 mw.
Reflector control, nickel rods:
　Total number _____ 10.
　Max. reactivity per rod _____ 2$.
　Total stroke _____ 35 inches.
Heat transfer system:
　Primary, sodium.
　Secondary, sodium.
　Tertiary, air.
Containment, main vessel (type 304 SS):
　I.D. at fissile fuel section _____ 40 inches.
　I.D. at upper section _____ 57 inches.
　Wall thickness _____ 0.375–0.750 in.
　Design pressure _____ 50 p.s.i.g.
Core:
　Diameter _____ 33.8 inches.
　Fissile fuel length _____ 33.8 inches.
　Neutron flux (peak>1 mev.) __ $1 \times 10^{14}$ neut./cm.² sec.
Fuel rod:
　Overall length _____ 120 inches.
　O.D. at fissile fuel section ____ 1.0 inch.
　Total No. in core _____ 618.
　Cladding _____ Type 316 stainless steel.
　[Hexagonal array with central moderator rod]
Moderator rod:
　BeO total No. in core _____ 108.
Shroud:
　Hexagonal, diameter across flats _____ 3.066 in.
　Length _____ 106 in.
　Wall thickness _____ 0.060 in.
　Material _____ Type 316 stainless steel.
Extension rod:
　Length neutron shield _____ 48.0 in.
　Length above neutron shield ___ 26 in.
　Maximum O.D. _____ 0.88 in.
　Material _____ Type 316 stainless steel and $B_4C$.
　Clad thickness _____ 0.040 in.
Coolant:
　Inlet temperature _____ 700° F.
　Outlet temperature _____ 820° F.
　Flow rate at power _____ 4360 g.p.m.
　Velocity in core _____ 8.6 ft./sec. average. 13.0 ft./sec. max.
　Heat transfer coefficient _____ 20,000 B.t.u./hr.-ft.²/° F.
Fuel loading:
　$U^{238}$ _____ 1598 kg.
　$Pu^{240}$ _____ 26 kg.
　$Pu^{239}$ _____ 296 kg.
　　Total _____ 1920 kg.
Fuel composition:
　$PuO_2$–$UO_2$ _____ 45.4 volume percent.
　BeO _____ 11.2 volume percent.
　Coolant (sodium) _____ 19.2 volume percent.
　Structure (steel) _____ 23.8 volume percent.
Physics data:
　Fraction of fissions below 9 kev. _____ 0.22.
　Prompt neutron lifetime _____ $0.36 \times 10^{-6}$ sec.
　Total neutron flux—
　　Core center _____ $6.4 \times 10^{14}$ n/cm.²-sec.
　　Average _____ $3.4 \times 10^{14}$ n/cm.²-sec.
　Gamma and neutron heating—
　　Prompt fission $\gamma$ _____ 7.8 mev./fission.
　　Fission product $\gamma$ ____ 7.2 mev./fission.
　　$(n, \gamma)$ Reaction _____ 8.2 mev./fission.
　　Inelastic scattering ___ 2.4 mev./fission.
　　Elastic scattering ____ 3.6 mev./fission.
　　　Total _____29.2 mev./fission.

What is claimed is:

1. In a fuel element for obtaining a thermal expansion coefficient of reactivity approaching zero and facilitating control of the rapidly rising reactivity of a nuclear reactor through the use of the Doppler broadening effect, the combination comprising an elongated tubular cladding having upper and lower closed ends defining a fissile fuel zone within said cladding, a plurality of from two to five serially arranged fuel segments in said zone, each segment having one end immovably fixed relative to said cladding within said fuel zone and with the free end of at least one of said segments together with a proximate fixed end of a second segment and the free end of the uppermost segment together with one end of said fuel zone defining void spaces of a length greater than the maximum thermal expansion length of said fuel segment at any temperature below the melting point of said fuel, resilient restoring means disposed within said void spaces, each restoring means affixed proximate one end thereof relative to said cladding, with the other end bearing against the free end surface of fuel segment to maintain the fixed end in position with respect to said cladding to permit each of said segments to thermally expand and contract in unison in the same direction.

2. A fuel element as defined in claim 1, wherein said segments are three to five fuel segments of equal length, and which are serially arranged within said fuel zone.

3. A fuel element as defined in claim 1, wherein a first fuel segment is affixed relative to said cladding proximate the lower end of said fuel zone extending into a region approximately 67% of the length of said fuel zone from the lower end thereof, a second fuel segment is affixed relative to said cladding above the upper portion of said region 67% of the length of said zone and extending into the upper portion of said fuel zone, with the upper end of said first fuel segment together with the lower end of said second fuel segment defining a first void space between said segments and the upper end of said second segment and the upper end of said fuel zone defining a second void space, said void spaces having a length greater than the maximum thermal expansion length of said fuel segment at any temperature below the melting point of the fuel.

References Cited by the Examiner

UNITED STATES PATENTS

| | | | |
|---|---|---|---|
| 2,852,460 | 9/1958 | Abbott et al. | 176—82 X |
| 2,969,674 | 1/1961 | Ogle | 176—76 X |
| 3,053,743 | 9/1962 | Cain | 176—76 X |
| 3,085,059 | 4/1963 | Burnham | 176—73 |
| 3,105,030 | 9/1963 | McGeary et al. | 176—73 |
| 3,184,392 | 5/1965 | Blake | 176—73 X |

References Cited by the Applicant

UNITED STATES PATENTS

| | | |
|---|---|---|
| 2,994,656 | 8/1961 | Zumwalt. |
| 3,010,889 | 11/1961 | Fortescue et al. |
| 3,039,944 | 6/1962 | Zumwalt. |
| 3,059,830 | 5/1963 | McGeary et al. |

BENJAMIN R. PADGETT, *Acting Primary Examiner.*

M. J. SCOLNICK, *Assistant Examiner.*